United States Patent [19]

Kanzaki et al.

[11] Patent Number: 5,568,213
[45] Date of Patent: Oct. 22, 1996

[54] DIAPHRAGM CONTROL DEVICE FOR A CAMERA

[75] Inventors: Masatoshi Kanzaki, Kanagawa-ken; Kimio Uematsu, Tokyo, both of Japan

[73] Assignee: Nikon Corporation, Tokyo, Japan

[21] Appl. No.: 470,203

[22] Filed: Jun. 15, 1995

[30] Foreign Application Priority Data

Sep. 6, 1994 [JP] Japan .................................. 6-212439

[51] Int. Cl.⁶ .............................. G03B 9/02; G03B 19/12
[52] U.S. Cl. ........................ 396/257; 396/505; 396/358
[58] Field of Search .............................. 354/152, 271.1, 354/446, 453, 484

[56] References Cited

U.S. PATENT DOCUMENTS

| | | | |
|---|---|---|---|
| 4,443,083 | 4/1984 | Nokano | 354/152 |
| 4,579,439 | 4/1986 | Takahata | 354/446 |
| 4,841,327 | 6/1989 | Yamamoto et al. | 354/271.1 |
| 5,349,405 | 9/1994 | Itabashi et al. | 354/152 |

Primary Examiner—A. A. Mathews
Attorney, Agent, or Firm—Oliff & Berridge

[57] ABSTRACT

A diaphragm control device for a camera capable of controlling a diaphragm member with a high level of precision is disclosed. The camera and diaphragm control device are equipped with a mirror member that moves from the down position to the up position during shooting of a subject, a mirror driving device to drive the mirror member, a diaphragm mechanism connected with the mirror member to control light rays from the subject, a diaphragm driving device to drive the diaphragm mechanism, a stopping device to stop the diaphragm driving device, and a control device to control the diaphragm driving device and the stopping device to stop the diaphragm mechanism at about a predetermined position. A correction device correct changes in the stopping characteristics of the stopping device to precisely stop the diaphragm mechanism at the predetermined position.

20 Claims, 7 Drawing Sheets

DIAPHRAGM CONTROL DEVICE FOR A CAMERA

BACKGROUND OF THE INVENTION

1. Field of the Invention

The present invention relates to a diaphragm control device for a camera, in particular, a diaphragm control device for a camera suited for use in a camera which drives a diaphragm of a camera with a motor.

2. Description of the Related Art

A camera is equipped with a diaphragm mechanism to control light rays from the subject by varying the size of the aperture to record an image of the subject with the proper amount of light.

This diaphragm mechanism functions by connecting with a mirror which moves from the down position to the up position during shooting of a subject.

With the rapid progress of electronic cameras in recent years, cameras which use motors to drive the above-mentioned aperture mechanism and mirror are being proposed.

The diaphragm control mechanism driven by a motor is controlled by the control device to assume a specified diaphragm step number (hereafter AV value).

Figure 7:
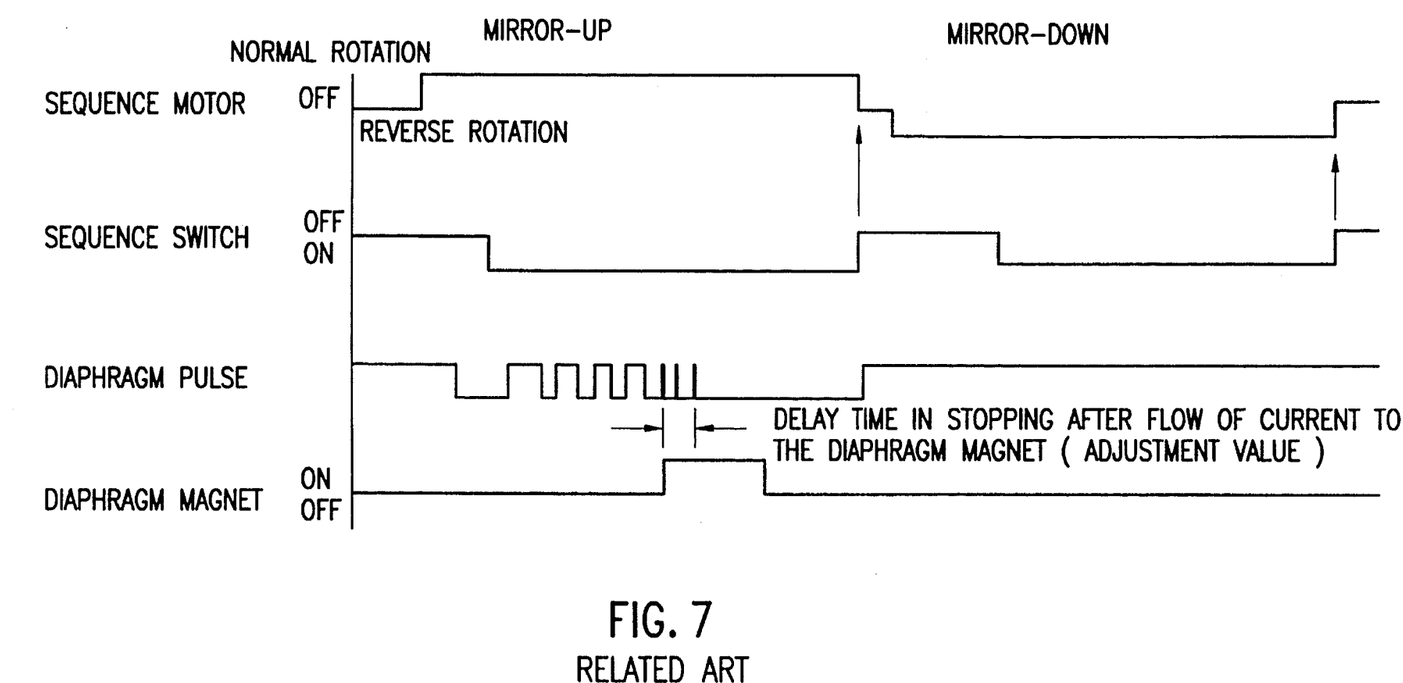
FIG. 7 is a timing chart of various electrical outputs of a related art mirror and diaphragm mechanism control device.

FIG. 7 is a drawing of a timing chart to control the diaphragm mechanism and the mirror using the above-mentioned control device. Hereinafter control operation of a related art control device will be explained with reference to FIG. 7.

A sequence motor to drive a mirror rotates, by command from the control device, in the normal direction to move the mirror up and in the reverse direction to move the mirror down between first and second positions in and away from an optical axis of said camera.

A sequence switch turns on and off by connection with the motion of the mirror.

A diaphragm pulse is a pulse to transmit the position data of the diaphragm mechanism to the control device.

A diaphragm magnet is a magnetic member acting as a stopping device to stop the motion of the diaphragm mechanism. The magnetic member receives electric current from the control device.

The control device recognizes a delay time from the reception of electric current by the diaphragm magnet to the actual stopping of the diaphragm mechanism as an adjustment value and controls the flow of electric current to the diaphragm magnet as follows.

The control device computes an estimated overrun pulse based on the period of the diaphragm pulse and the above-mentioned adjustment value and controls the flow of electric current to the diaphragm magnet in such a manner that the target diaphragm position is realized ultimately by adding the estimated number of overrun pulses to the diaphragm pulse generated.

However, in the diaphragm control device for a related art camera, the problem occurs that, due to changes in the voltage applied to the motor to drive the diaphragm magnet and the diaphragm mechanism, the time for the diaphragm magnet to stop the diaphragm changes, resulting in a failure to control the diaphragm precisely.

Moreover, even if the voltage applied to the diaphragm magnet is uniform, the acceleration of the diaphragm mechanism during the diaphragm pulses period is not uniform, resulting in a failure to control the diaphragm mechanism precisely.

SUMMARY OF THE INVENTION

An object of the present invention is to provide a diaphragm control device for a camera capable of controlling a diaphragm member with a high level of precision regardless of changes in voltage and the period of the diaphragm pulses.

To solve the above and other problems, the diaphragm control device for a camera of the present invention is equipped with a mirror member which moves from the down position to the up position during shooting of a subject, a mirror driving device to drive the mirror member, a diaphragm mechanism connected to the mirror member to control light rays from the subject, a diaphragm driving device to drive the diaphragm mechanism, a stopping device to stop the diaphragm driving device, and a control device to control the diaphragm driving device and the stopping device to make the diaphragm of the diaphragm mechanism equal to the specified diaphragm value, and further includes a correction device to correct the actuation time of the stopping device.

In a modified diaphragm control device of the present invention, the power source to drive the mirror driving device and the stopping device are the same, and the correction device corrects changes in the actuation time of the stopping device based on the moving time of the mirror member.

In a second embodiment of the present invention, the diaphragm control device further comprises a voltage detection member to detect the voltage applied to the stopping device, and the correction device corrects the actuation time of the stopping device based on the detection results of the voltage detection member.

The diaphragm control device for a camera of the present invention is equipped with a mirror member which moves from the down position to the up position during shooting of a subject, a mirror driving device to drive the mirror member, a diaphragm mechanism connected with the mirror member to control light rays from the subject, a diaphragm driving device to drive the diaphragm mechanism, a stopping device to stop the diaphragm driving device, and a control device to control the diaphragm driving device and the stopping device to make the diaphragm of the diaphragm mechanism equal the specified diaphragm value, and further includes a correction device to correct the actuation time of the stopping device based on the driving characteristics of the diaphragm mechanism.

In the diaphragm control device for a camera of the present invention, the correction device corrects the actuation time of the stopping device, enabling the diaphragm mechanism to assume a specified diaphragm value with a high level of precision.

In the diaphragm control device for a camera of a first embodiment of the present invention, the correction device corrects changes in the actuation time of the stopping device based on the moving time of the mirror member, enabling the diaphragm mechanism to assume a specified diaphragm value with a high level of precision.

In the diaphragm control device for a camera of the second embodiment of the present invention, the correction device corrects changes in the stopping characteristics of the stopping device based on the detection results of a voltage detection element, enabling the diaphragm mechanism to assume a specified diaphragm value with a high level of precision.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

A first embodiment will be explained with reference to FIG. 1–FIG. 4.

Figure 1:
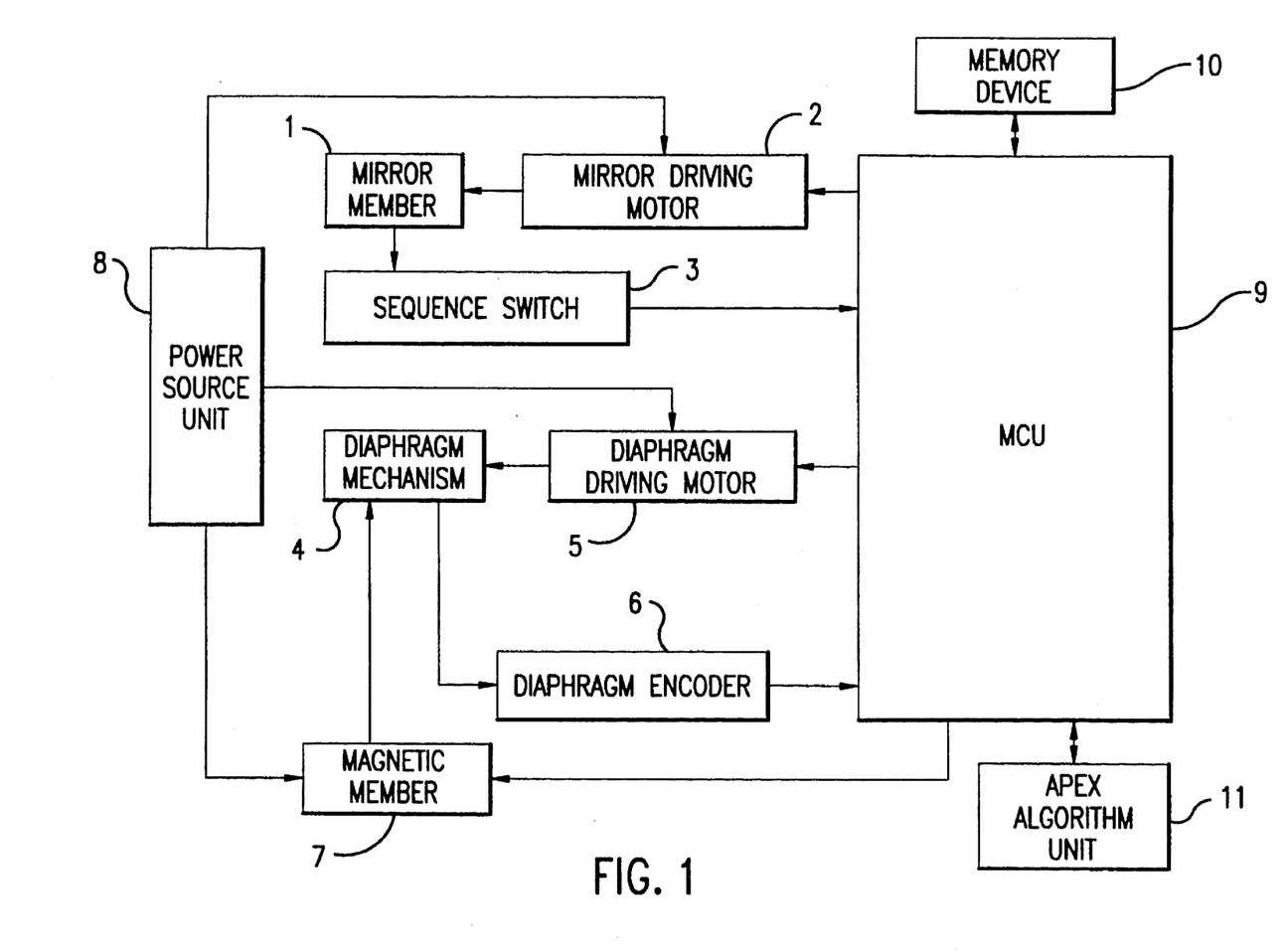
FIG. 1 is a block diagram of a camera according to a first embodiment of the present invention.
Figure 2:
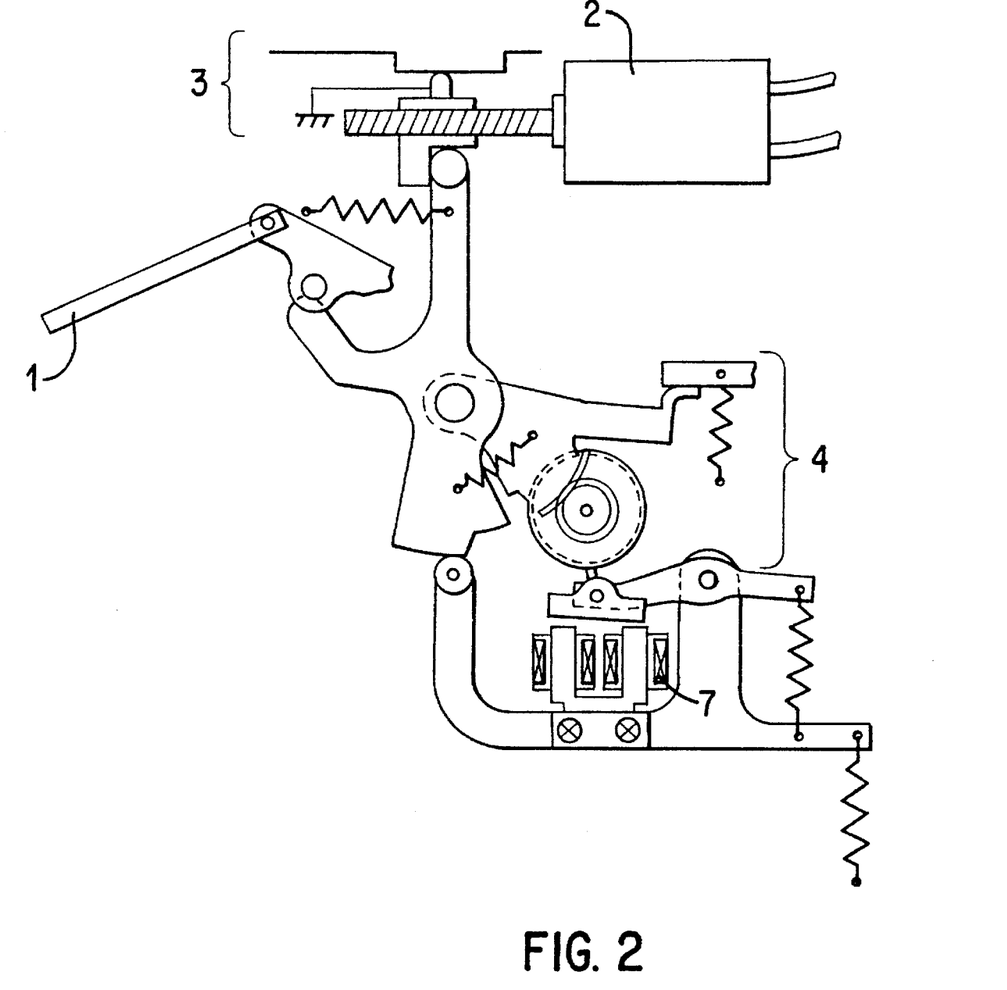
FIG. 2 is a schematic diagram of a portion of the camera of FIG. 1.

The mirror member 1 is driven to the up position and the down position by a mirror driving motor 2. The mirror member 1 takes the down position to guide light rays from the subject to an unpresented finder unit and takes the up position during shooting.

A sequence switch 3 detects the position of the mirror member 1 and outputs the results of the detection to the microcomputer 9 (hereafter MCU 9) to be explained later.

A diaphragm mechanism 4 is driven by a diaphragm driving motor 5. Moreover, driving of the diaphragm mechanism 4 connects with the mirror member 1 for being driven together.

A diaphragm encoder 6 monitors the movement of the diaphragm mechanism 5, and the results of this monitoring are outputted to a microcomputer unit (MCU) 9 to be explained later.

The magnetic member 7, the stopping device, stops the driving of the diaphragm mechanism 4. In the present embodiment, power is supplied to the mirror driving motor 2, the diaphragm driving motor 5, and the magnetic member 7 by the power source unit 8.

The MCU 9 controls the entire camera. In particular, it controls the mirror driving motor 2, the diaphragm driving motor 5, the diaphragm encoder 6, and the magnetic member 7. Moreover, the MCU 9 computes the time from the down position to the up position of the mirror 1 based on the position data of the mirror member 1 outputted from the sequence switch 3 and stores the results of the computation in a memory device 10.

In addition, the MCU 9 enters the necessary data from the memory device 10 and an APEX algorithm unit 11.

The memory device 10 stores the up-time with the power source unit 8 in normal voltage, the delay time until the magnetic member 7 receives electric current with the power source unit 8 in normal voltage, and the previous mirror-up time.

The APEX algorithm unit 11 computes the diaphragm step number or position determining the size of the diaphragm opening (hereafter AV value) of the diaphragm mechanism 4 and outputs the results of the computation to the MCU 9.

Moreover, even if the AV value is specified manually, the APEX algorithm unit 11 outputs the specified AV value to the MCU 9.

The other components of the camera in the present embodiment are the same as in cameras that are known. Therefore, explanation of these components will be omitted here.

Next, explanation of the operation of the camera in the present embodiment will be given.

Figure 3:
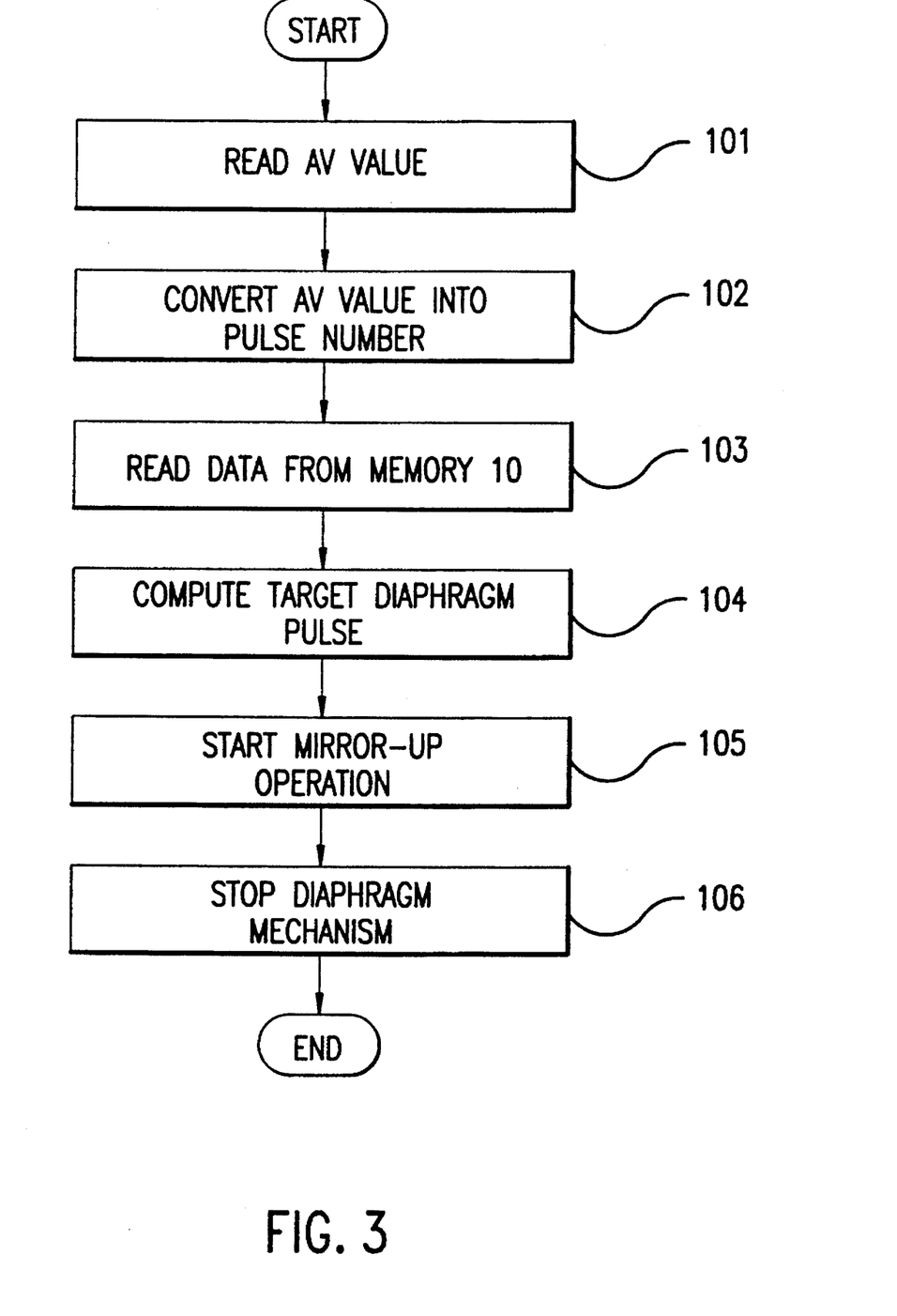
FIG. 3 is a flow chart for operation by the microcomputer unit (MCU) of the camera of FIG. 1.

FIG. 3 is a flow chart describing the operation of the MCU 9.

With reference to FIG. 3, the flow chart begins upon receiving release signals from the unpresented release switch.

The MCU 9 reads the computed AV value from the APEX algorithm unit 11 (step 101).

After reading the AV values, the MCU 9 converts the AV value into a number of pulses (step 102).

The MCU 9 reads the up-time with the power source unit 8 in normal voltage, the delay time until the magnetic member 7 receives electric current with the power source unit 8 in normal voltage, and the previous mirror-up time for moving the mirror member 1 from the first position to the second position (step 103).

MCU 9 computes target diaphragm pulses based on the number of pulses determined at step 102 and the three data read in step 103 in order to set the diaphragm mechanism 4 to the AV value outputted from the APEX algorithm unit 11 (step 104).

Figure 4:
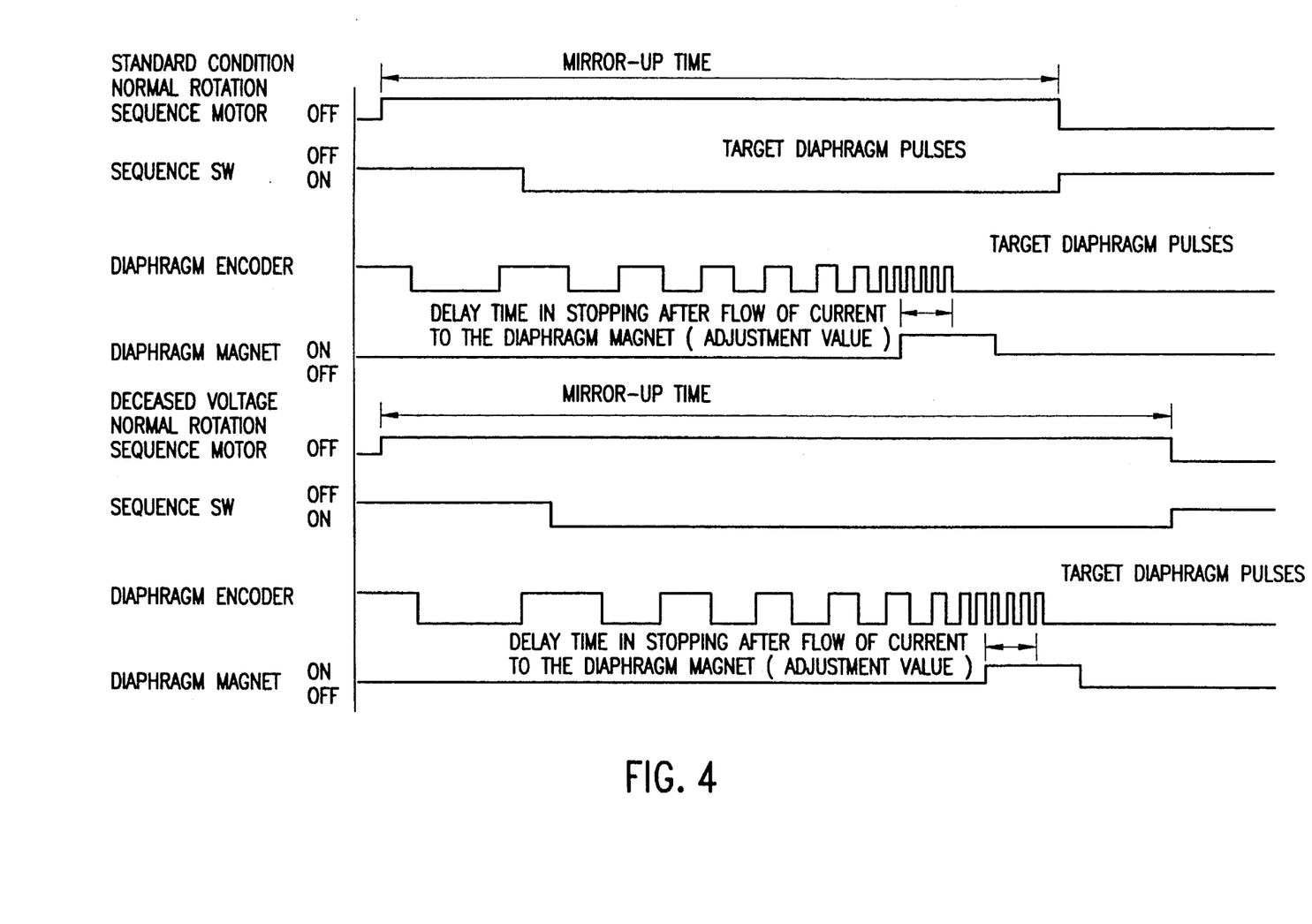
FIG. 4 is a timing chart of various electrical outputs to control the mirror and control the diaphragm mechanism of the camera of FIG. 1.

FIG. 4 is a drawing describing a comparison between control of the diaphragm mechanism 4 with the power source unit in normal voltage and control of the diaphragm mechanism 4 with the power source unit 8 having a decreased voltage.

In FIG. 4, if the power source unit 8 is in normal voltage, the MCU 9 can compute the target diaphragm pulses by taking the above-mentioned delay time into consideration to set the diaphragm mechanism 4 to the AV value outputted from the APEX algorithm unit 11 precisely.

However, if the voltage of the power source unit 8 drops, the magnetic member 7 takes more time than normal to stop the diaphragm mechanism 4. Hence, the MCU 9 fails to set the diaphragm mechanism 4 to the AV value outputted from the APEX algorithm unit 11 precisely.

In the present embodiment, because the mirror driving motor 2 and the magnetic member 7, the stopping device, use the same power source unit 8, if the voltage of the power source unit drops, the mirror-up time becomes longer than usual (see FIG. 4).

Therefore, the MCU 9 corrects the actuation time of the stopping device, magnetic member 7, by outputting the target diaphragm pulses taking the previous mirror-up time into consideration. Hence, the MCU 9 can set the diaphragm mechanism 4 to the AV value outputted from the APEX algorithm unit 11 with a high level of precision even if the voltage of the power source unit 8 drops.

Following the flow chart in FIG. 3, the MCU 9 begins the mirror-up operation of the mirror member 1 (step 105).

The diaphragm encoder 6 outputs diaphragm pulses synchronized with the mirror-up operation.

The MCU 9 causes electric current to flow in the magnetic member 7 based on the results of the computation in step 104 and the diaphragm pulses from the encoder 6, and stops the diaphragm mechanism 4 (step 106).

Figure 6:
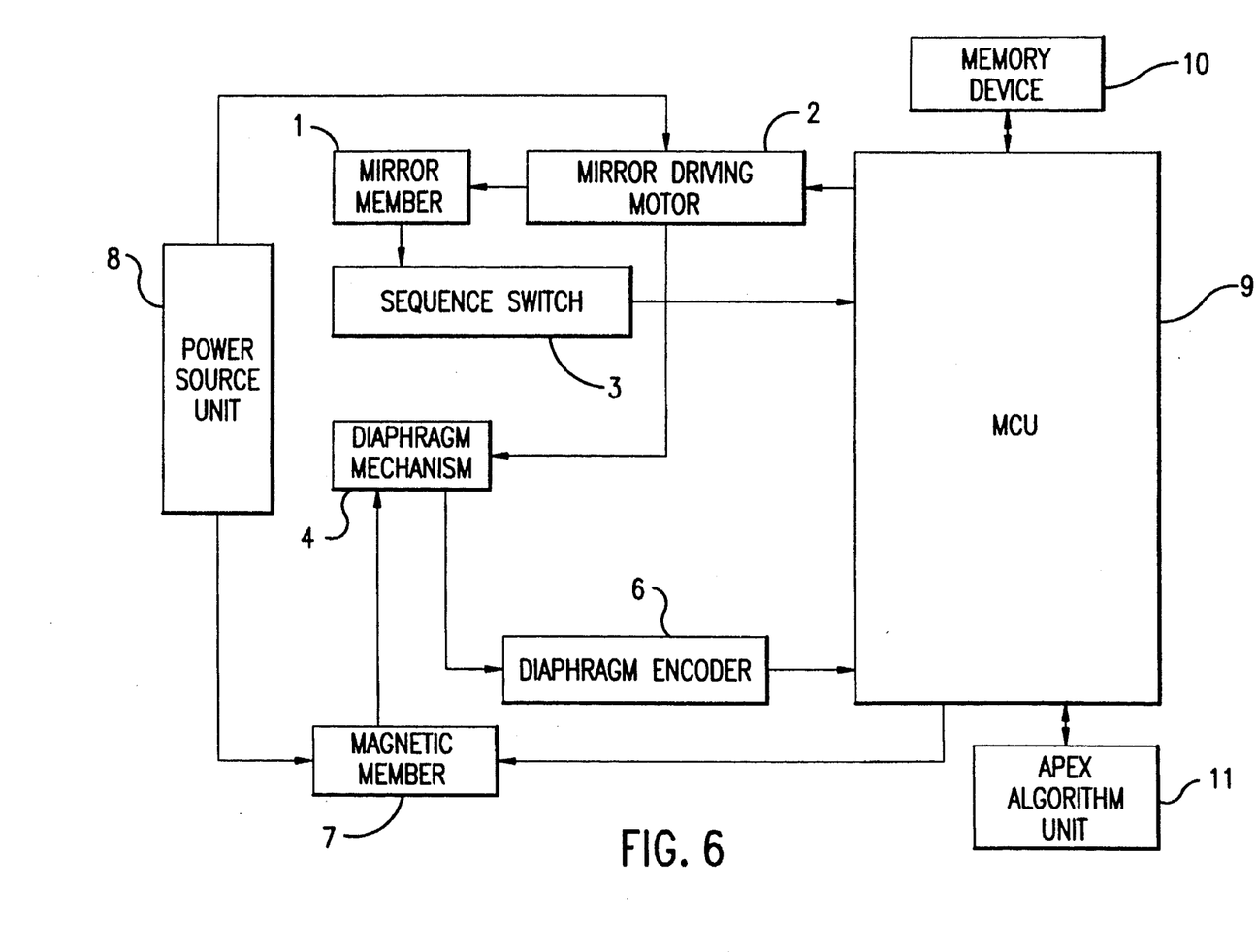
FIG. 6 is block diagram of a modified example of a camera according to the present invention.

FIG. 6 is a block diagram describing a modified example of the present invention in which the mirror member 1 and the diaphragm mechanism 4 are driven by the same motor (mirror driving motor 2).

Next, the second embodiment of the present invention will be explained with reference to FIG. 5. The components of FIG. 5 which are the same as in the block diagram of FIG. 1 will be denoted by the same symbols and explanation thereof will be omitted.

Figure 5:
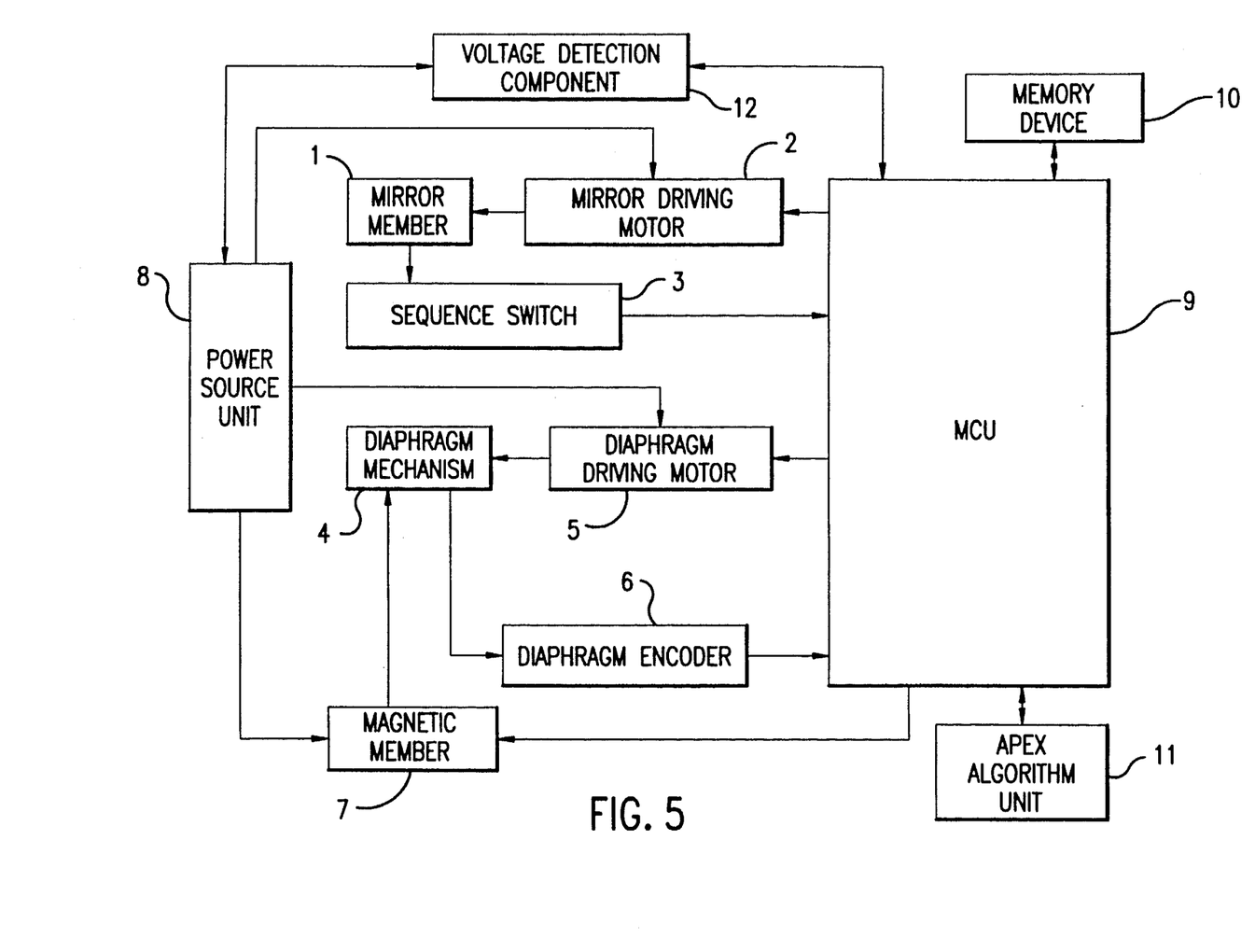
FIG. 5 is a block diagram of a camera according to a second embodiment of the present invention.

With reference to FIG. 5, a voltage detection device 12 monitors the voltage of the power source unit 8 and outputs the results to the MCU 9.

In the second embodiment, the MCU 9 computes the target diaphragm pulses by detecting the voltage of the power source unit 8 instead of detecting the mirror-up time.

Hence the MCU 9 can set the diaphragm mechanism 4 to the AV value outputted from the APEX algorithm unit 11 precisely, even if the voltage of the power source unit 8 fluctuates.

Through detection of the voltage of the power source unit 8, the voltage applied to the magnetic member 7 can be detected regardless of whether the mirror driving motor 2 and the magnet 7 use a common power source unit or separate units.

Moreover, even if the voltage of the power source unit 8 is uniform, if the acceleration of driving the diaphragm mechanism 4 is not uniform, the period of the diaphragm pulses outputted by the diaphragm encoder 6 fluctuates. Hence, the MCU 9, acting as a control device, fails to control the diaphragm mechanism 4 to stop at a desired predetermined position with a high level of precision.

In this case, even if the acceleration during the driving of the diaphragm mechanism 4 is not uniform, compensation for the varying acceleration can be made. By storing data of the characteristics of the acceleration during the driving of the diaphragm mechanism 4 in the memory device 10 beforehand, the MCU 9 can control the diaphragm mechanism 4 precisely.

As described above, the diaphragm control device for a camera can set the diaphragm mechanism to a specified diaphragm value precisely because the correction device corrects the time of actuation of the stopping device.

In the diaphragm control device for a camera according to the first embodiment of the present invention, the correction device included in MCU 9 corrects the time of actuation of the stopping device based on the moving time of the mirror member 1. Hence, the diaphragm mechanism 4 can be set to a specified diaphragm value with a high level of precision. Moreover, correction of the time of actuation of the stopping device or magnetic member 7 is executed without measuring the voltage of the power source unit because the mirror driving device 2 and the magnetic member 7 use the same power source unit 8. Hence, changing of the stopping characteristics of the stopping device is realized with a simple structure.

In the diaphragm control device for a camera according to the second embodiment of the present invention, the correction device included in MCU 9 corrects the actuation time of the stopping device based on the detection results of the voltage detection device 12. Thus the diaphragm mechanism is set to a specified diaphragm value with a high level of precision. Moreover, the control device is easy to use because it can be used regardless of whether the mirror driving device and the stopping device use the same power source unit.

In the diaphragm control device for a camera according to the present invention, the correction device corrects the actuation time of the stopping device of the diaphragm mechanism, enabling setting of the diaphragm mechanism to a specified diaphragm value precisely.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A diaphragm control device for a camera equipped with a mirror member and a mirror driving device to drive said mirror member to move between a first position on an optical axis of said camera and a second position off said optical axis of said camera, said diaphragm control device comprising:

a diaphragm mechanism connected to said mirror member that controls light recorded by said camera;

a diaphragm driving device to drive said diaphragm mechanism;

a stopping device to stop said diaphragm driving device;

a control device to control said diaphragm driving device and said stopping device to stop said diaphragm mechanism at about a predetermined position; and a correction device to correct an actuation time of said stopping device based on variations in the operation of said diaphragm control device to precisely stop said diaphragm mechanism at said predetermined position.

2. A diaphragm control device according to claim 1, further comprising a single power source unit to actuate said stopping device and to drive said mirror driving device between said first and second positions, wherein said correction device corrects said actuation time based on a previous time of movement of said mirror member from said first position to said second position.

3. A diaphragm control device according to claim 1, further comprising a voltage detection device to detect a voltage applied to said stopping device and to output detection results to said correction device, wherein said correction device corrects said actuation time based on said detection results.

4. A diaphragm control device according to claim 1, wherein said stopping device comprises a magnetic member that is electrically actuated to stop movement of said diaphragm driving device.

5. A diaphragm control device according to claim 1, further comprising a memory device that stores data of the last previous time of movement of said mirror member from said first position to said second position, wherein said correction device corrects said actuation time based on said stored data of said last previous time of movement.

6. A diaphragm control device according to claim 5, wherein said memory device stores data of another measured time of movement of said mirror member from said first position to said second position and data of a measured time from the start of movement of said mirror member from said first position to the time of actuation of said stopping device, and wherein said correction device corrects said actuation time based on all of said stored data.

7. A diaphragm control device according to claim 1, wherein said mirror driving device and said diaphragm mechanism driving device comprise a single motor that drives said mirror member and said diaphragm mechanism.

8. A diaphragm control device according to claim 1, further comprising a memory device that stores data of the acceleration of said diaphragm mechanism, wherein said correction device corrects said actuation time based on said stored data.

9. A diaphragm control device according to claim 1, wherein said control device and said correction device comprise a microcomputer unit and an algorithm unit that inputs data of said predetermined position of said diaphragm mechanism to said microcomputer unit.

10. A diaphragm control device according to claim 1, further comprising a diaphragm encoder that outputs data of the position of said diaphragm mechanism to said correction device.

11. A diaphragm control device for a camera equipped with a mirror member and a mirror driving means to drive said mirror member to move between a first position on an optical axis of said camera and a second position off said optical axis of said camera, said diaphragm control device comprising:

diaphragm means connected to said mirror member for controlling light recorded by said camera;

diaphragm driving means for driving said diaphragm means;

stopping means for stopping said diaphragm driving means;

control means for controlling said diaphragm driving means and said stopping means to stop said diaphragm means at about a predetermined position; and correction means for correcting an actuation time of said stopping means based on variations in the operation of said diaphragm control device to precisely stop said diaphragm mechanism at said predetermined position.

12. A diaphragm control device according to claim 11, further comprising voltage detection means for detecting a voltage applied to said stopping means and for outputting detection results to said correction means, wherein said correction means corrects said actuation time based on detection results.

13. A diaphragm control device according to claim 11, wherein said stopping means comprises a magnetic means that is electrically actuated to stop movement of said diaphragm driving means.

14. A diaphragm control device according to claim 11, further comprising a memory means for storing data of the last previous time of movement of said mirror member from said first position to said second position, wherein said correction means corrects said actuation time based on said stored data of said last previous time of movement.

15. A diaphragm control device according to claim 14, wherein said memory means stores data of another measured time of movement of said mirror member from said first position to said second position and data of a measured time from the start of movement of said mirror member from said first position to the time of actuation of said stopping means, and wherein said correction means corrects said actuation time based on all of said stored data.

16. A diaphragm control device according to claim 11, further comprising a memory means for storing data of the acceleration of said diaphragm means, wherein said correction means corrects said actuation time based on said stored data.

17. A method of controlling a diaphragm mechanism in a camera equipped with a mirror member and a mirror driving device to drive said mirror member to move between a first position on an optical axis of said camera and a second position off said optical axis of said camera, said diaphragm control device including a diaphragm mechanism with selectable diaphragm step numbers connected to said mirror that controls light recorded by said camera, a diaphragm driving device to drive said diaphragm mechanism, and a stopping device to stop said diaphragm driving device at a predetermined position, comprising the steps of:

(a) determining a diaphragm step number;

(b) converting the diaphragm step number into a plurality of electrical pulses;

(c) determining data of a measured time of movement of said mirror member from said first position to said second position, and data of a measured time from the start of movement of said mirror member from said first position to the time of actuation of said stopping device;

(d) computing target diaphragm pulses based on said electrical pulses and all of said data; and (e) determining an actuation time of said stopping device based on said computed target diaphragm pulses.

18. A method of controlling a diaphragm mechanism in a camera according to claim 17, wherein said determining step (c) comprises determining data of a measured time of the last previous movement of said mirror member from said first position to said second position, and said computing step (d) comprises computing target diaphragm pulses based on said data of said measured time of the last previous movement.

19. A method of controlling a diaphragm mechanism in a camera according to claim 17, further comprising the step of detecting a voltage supplied to said stopping device, wherein said determining step (c) comprises computing target diaphragm pulses based on the detected voltage.

20. A method of controlling a diaphragm mechanism in a camera according to claim 17, wherein said determining step (c) comprises determining data of an acceleration of said diaphragm mechanism, and said computing step (d) comprises computing target diaphragm pulses based on said data of an acceleration.

* * * * *